United States Patent [19]

Neilson

[11] 4,372,624

[45] Feb. 8, 1983

[54] DYNAMIC O-RING SEAL

[75] Inventor: William J. Neilson, Murrieta, Calif.

[73] Assignee: Smith International, Inc., Newport Beach, Calif.

[21] Appl. No.: 270,452

[22] Filed: Jun. 4, 1981

[51] Int. Cl.³ .......................................... F16C 33/74
[52] U.S. Cl. ..................................... 384/94; 277/168
[58] Field of Search ................. 308/8.2, 36.3, 36.2, 308/36.1, 187.1, 187.2; 277/167.5, 168, 171, 177, 190, 170

[56] References Cited

U.S. PATENT DOCUMENTS

| | | | |
|---|---|---|---|
| 2,360,731 | 10/1944 | Smith | 286/26 |
| 2,593,193 | 4/1952 | Rockwell | 277/177 |
| 3,186,739 | 6/1965 | Mahoff | 277/177 |
| 3,397,928 | 8/1968 | Galle | 308/8.2 |
| 3,620,580 | 11/1971 | Cunningham | 308/8.2 |
| 3,905,450 | 9/1975 | Persson | 277/177 |

Primary Examiner—Lenard A. Footland
Attorney, Agent, or Firm—Robert G. Upton

[57] ABSTRACT

An O-ring shaft seal is disclosed to isolate a lubricated bearing from an external environment as utilized in a typical sealed bearing rotary rock bit. The O-ring is confined within a pair of symmetrical and complementry V-shaped surfaces, each surface having a rounded vertex. A first V-shaped surface is formed on a bearing journal which is integral with a body of the rock bit, a second V-shaped surface being formed in a cutter cone mounted on the journal. A pressure differential across the O-ring in either direction will force the O-ring into porportionately tighter contact with the converging sides of both V-shaped surfaces.

9 Claims, 3 Drawing Figures

DYNAMIC O-RING SEAL

BACKGROUND OF THE INVENTION

1. Field of the Invention

Rotary rock bits and earth boring cutters used in well drilling, mining and the like commonly operate submerged in liquid which is circulated to remove heat and cuttings from the work site. A dynamic seal isolates this circulating, abrasive-laden liquid from the lubricated bearing surfaces which support the rotating rock cutting cones. A pressure balancing system minimizes pressure differentials across the seal.

2. Description of the Prior Art

Face seals and shaft seals comprised of an O-ring confined between relatively rotating surfaces within a groove of rectangular cross section and exerting a predetermined amount of deformative squeeze against the O-ring are well known in the prior art. A relatively small amount of squeeze is desirable to minimize heating, wear and frictional losses. Some pressure differentials are known to occur across the seal and enough squeeze to resist such pressures must be used. "Twisting", "bunching" and "snaking" conditions also interfere with the sealing functions of such O-ring seals. U.S. Pat. No. 2,200,151 teaches use of an O-ring confined in a groove of cross sectional shape similar to that herein described. The seal is characterized as a static face seal wherein squeeze is varied by using pressure across the seal to move housing surfaces normal to the sealing direction.

The instant invention is distinguished over this cited art in that it is a dynamic shaft seal wherein the squeeze is varied by using pressure across the seal to move the O-ring parallel to the sealing direction.

SUMMARY OF THE INVENTION

The object of this invention is to produce a dynamic O-ring shaft seal which will utilize a minimum amount of squeeze when essentially no pressure differential exists across the seal. The amount of squeeze so utilized may be significantly less than would be used in a conventionally designed seal wherein maximum pressure differentials must be anticipated.

This invention is an O-ring shaft seal to isolate a lubricated bearing from an external environment. A resilient O-ring is confined within an annular chamber formed between a bearing journal and a rotating part mounted thereon. The chamber is formed by the cooperation of two substantially radial surfaces and two concentric and substantially cylindrical surfaces. Either one or both of the cylindrical surfaces are shaped substantially in a V with the vertex centrally positioned on the cylindrical length. The V is directed so as to enlarge the annular chamber at the vertex. Differential pressure across the O-ring moves the O-ring axially away from the vertex, or vertices, thereby increasing the squeeze on the O-ring between the converging cylindrical walls of the chamber. The tightening of the seal resists egress of lubricant from the bearing or ingress of foreign material from the external environment into the bearing.

Rounding of the vertex of the V, with a radius up to the radius of the cross section of the O-ring, increases the O-ring's area of contact, during periods of low differential pressure, to maximize sealing and minimize O-ring wear.

The present invention utilizes a pressure differential, in either direction to force the O-ring into axial displacement and thus into tighter contact with the converging chamber walls. The V-shaped surfaces provide a self-regulating squeeze which increases proportionately relative to the pressure differential across the O-ring. Self-regulation occurs across all sections of the O-ring, providing an important additional benefit—minimization of O-ring tendencies to twist, bunch or snake.

An advantage of this invention over the prior art resides in an extended life expectancy produced by a significant reduction in the basic amount of squeeze required. Substantial amounts of reserve squeeze can be provided to be utilized only when, and to the degree, required.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
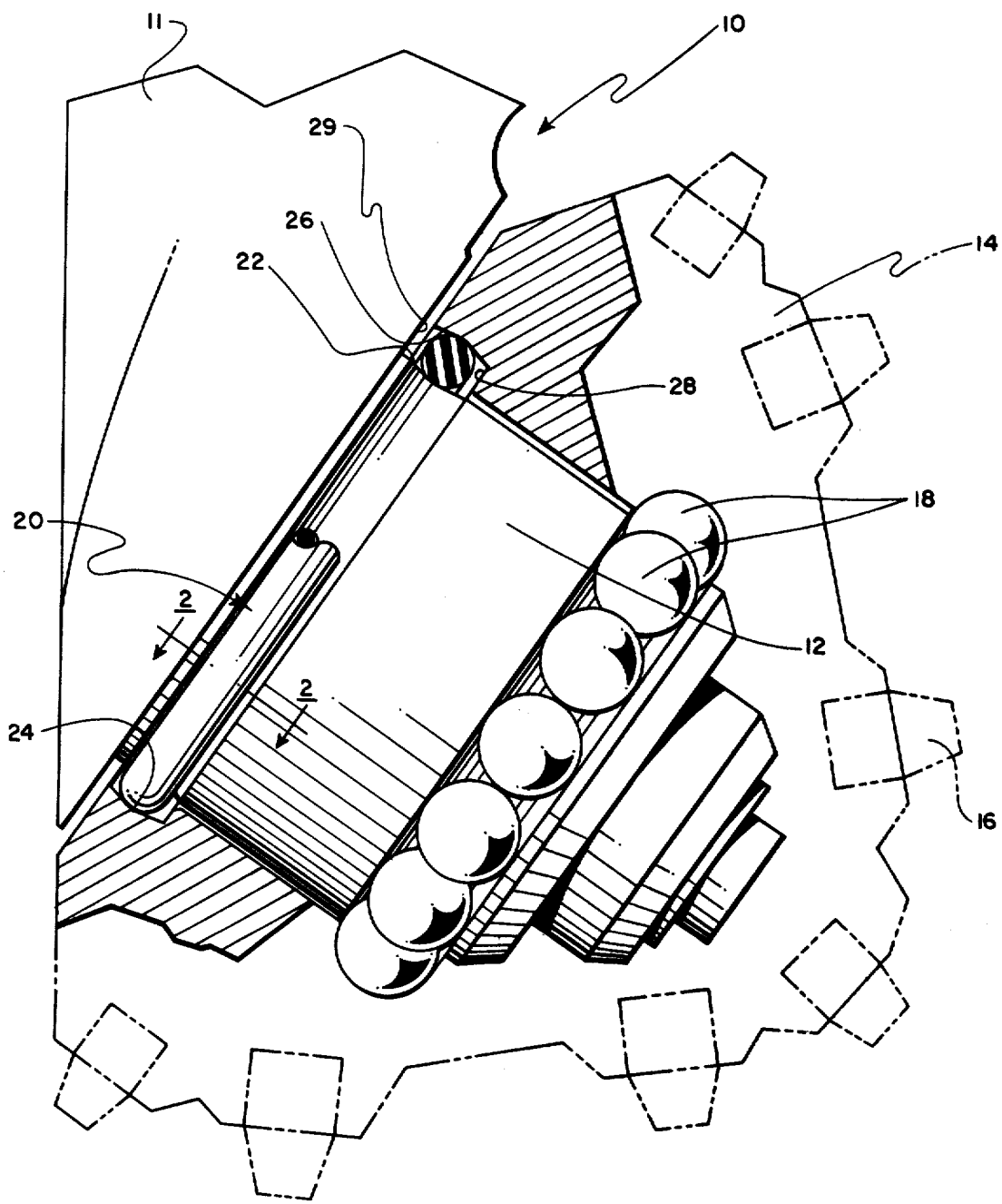
FIG. 1 is a partial section through a rock cutting cone and supporting journal assembly illustrating a seal constructed in accordance with the present invention.

Turning now to FIG. 1, a typical rock drill bit, generally designated as 10, features one or more downwardly extending projections or legs 11 which support a cantilevered bearing journal 12 projecting downwardly and inwardly, rotatably supporting a cutter cone 14 equipped with inserted hard metal teeth 16. Bearing balls 18 typically retain the cutter cone on the bearing journal 12. An O-ring 20 is confined within a pair of symmetrical and complementary V-shaped surfaces 22 and 26. One V-shaped surface is located in the journal 12 and a second V-shaped surface 26 is positioned in the bore of the cone 14.

When pressures across the O-ring seal 20 are very low, then the O-ring runs in the vertices 24 of the V-shaped surfaces, as depicted in the illustrations. A minimum amount of squeeze is imposed upon the O-ring 20 while it is located between the vertices 24. When a larger pressure occurs across the O-ring, the O-ring 20 is forced to move, toward the lower pressure side, between the converging walls 22 and 26 of the chamber, thus imposing upon the O-ring a proportional increase in squeeze. Dynamic stability of the seal is maintained, and the extent of automatic squeeze compensation is limited to a practical value, by the positioning of chamber limiting side walls 28 and 29.

Figure 2:
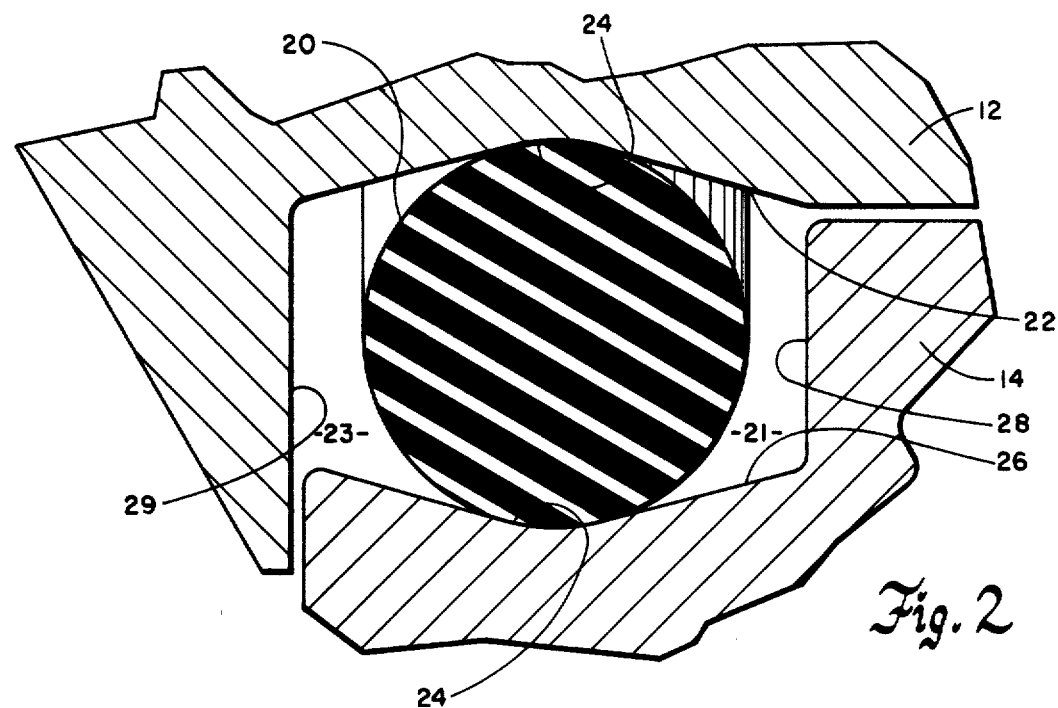
FIG. 2 is an enlarged cross section of the seal taken through 2—2 of FIG. 1.

FIG. 2 illustrates the invention more closely while using the same numbering. A chamber 21 is defined by the O-ring 20, the V-shaped surfaces 22 and 26 and side wall 28. A chamber 23 is defined by the O-ring 20, the V-shaped surfaces 22 and 26 and side wall 29. Chamber 21 is generally filled with lubricant and chamber 23 is in communication with the external environment.

Generally a pressure balancing system (not shown) is used to apply pressure to the lubricant, roughly equal to the pressure existing in the external environment. When the lubricant in chamber 21 is at a higher pressure than the fluid in chamber 23, then that higher pressure urges the O-ring 20 into the chamber 23 and into tighter sealing contact with the converging chamber walls 22 and 26.

When the lubricant in chamber 21 is at a lower pressure than the fluid in chamber 23, then that fluid pressure urges the O-ring 20 into chamber 21 and into tighter sealing contact with the converging chamber walls 22 and 26.

Undesirable O-ring conditions, commonly referred to as twisting, sticking, bunching and snaking, are all unstable conditions characterized by an uneven distribution of stresses around the O-ring. An advantage of this invention is that a similarly uneven distribution of squeeze is produced in various sections around the O-ring, in such a way as to stabilize conditions.

Figure 3:
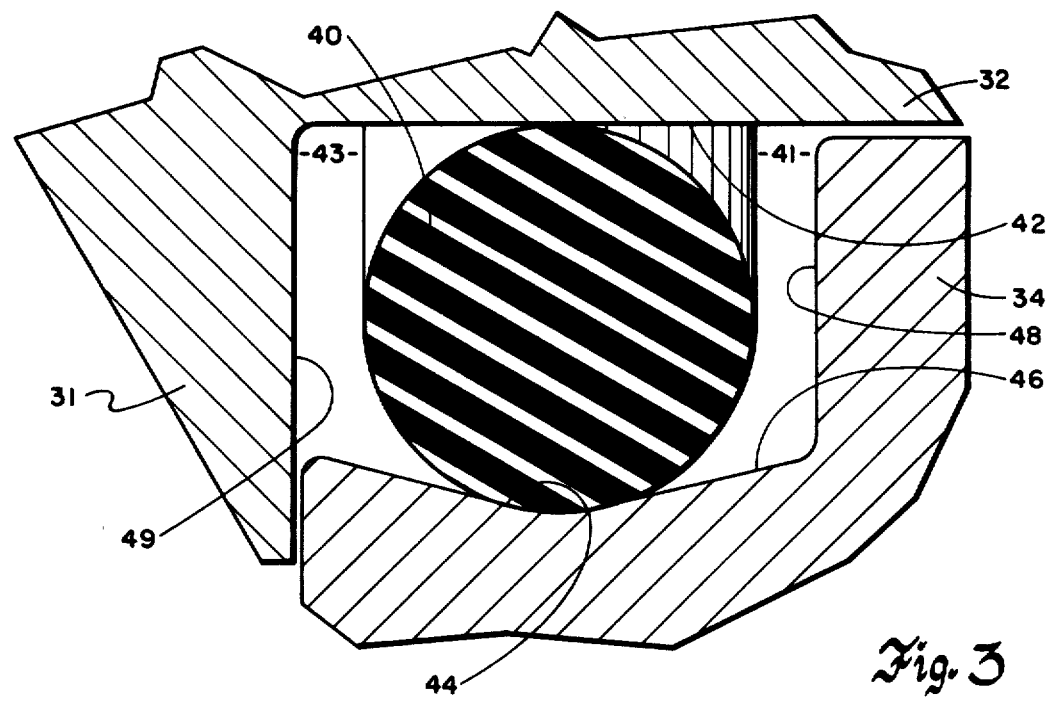
FIG. 3 is an enlarged cross section of the seal of another embodiment of the invention.

FIG. 3 illustrates another embodiment of the invention wherein only one V-shaped surface 46 is utilized. As noted, the journal 32 has no V-shaped surface. It would additionally be obvious to form the V in the journal 32 and leave the cone 34 straight (not shown). The important feature is that in moving either direction from the V-groove vertex 44, that the confining chamber walls 42 and 46 do converge to increase the squeeze on the O-ring.

The included angle of the V-shaped cylindrical surface along with the axial dimension of the annular chamber control the rate and range of increase in squeeze with changes in differential pressure. The preferred axial dimension is from one and one-half to two and one-half times the cross sectional diameter of the O-ring. The preferred included angle of the V-shaped surface is from 110 degrees to 170 degrees with about 150 degrees being ideal.

The typical O-ring as discussed relative to FIGS. 1 through 3 is fabricated from, for example, a resilient nitrile material.

Chamber 41, defined by an O-ring 40, surfaces 42 and 46 and side wall 48 is filled with a lubricant which may be backed up by a pressure balancing system. Chamber 43, defined by the O-ring 40, surfaces 42 and 46 and side wall 49, is filled with the environment fluid.

Excess pressure within either chamber 41 or 43 will urge the O-ring 40 into the opposite chamber and into tighter sealing contact with the converging chamber walls 42 and 46.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. An O-ring shaft seal to isolate a lubricated bearing from an external environment comprising a resilient O-ring confined within an annular chamber, said chamber being formed, between a bearing journal and a rotating part mounted thereon, by the cooperation of two substantially radial surfaces and two concentric and substantially cylindrical surfaces formed between said journal and said rotating part, with at least one of said cylindrical surfaces being shaped substantially in a V with a vertex positioned about centrally on the cylindrical length, and directed so as to enlarge said annular chamber at said vertex, said cylindrical V-shaped surface has an included angle in the range of 110 degrees to 170 degrees, differential pressure across said O-ring moves said O-ring axially away from said vertex thereby increasing the squeeze on said O-ring thus resisting egress of lubricant from a bearing or ingress of a material from said external environment into said bearing.

2. An O-ring shaft seal to isolate a lubricated from an external environment comprising a resilient-O-ring confined within an annular chamber, said chamber being formed, between a bearing journal and a rotating part mounted thereon, by the cooperation of two substantially radial surfaces and two concentric and substantially cylindrical surfaces formed between said journal and said rotating part, with at least one of said cylindrical surfaces being shaped substantially in a V with a vertex positioned about centrally on the cylindrical length, and directed so as to enlarge said annular chamber at said vertex, said cylindrical V-shaped surface has an included angle of about 150 degrees, differential pressure across said O-ring moves said O-ring axially away from said vertex thereby increasing the squeeze on said O-ring thus resisting egress of lubricant from a bearing or ingress of a material from said external environment into said bearing.

3. An O-ring shaft seal to isolate a lubricated bearing from an external environment comprising a resilient O-ring confined within an annular chamber, said chamber being formed, between a bearing journal and a rotating part mounted thereon, said rotating part is a rock bit cutter cone, by the cooperation of two substantially radial surfaces and two concentric and substantially cylindrical surfaces formed between said journal and said rotating part, with at least one of said cylindrical surfaces being shaped substantially in a V with a vertex positioned about centrally on the cylindrical length, and directed so as to enlarge said annular chamber at said vertex, differential pressure across said O-ring moves said O-ring axially from said vertex thereby increasing the sqeeze on said O-ring thus resisting egress of lubricant from a bearing or ingress of a material from said external environment into said bearing.

4. A rock bit having at least one bearing journal having an axis and a cutter rotatively mounted on said journal about said axis, the bearing surfaces between the journal and the cutter being lubricated by an internal supply of lubricant, the rock bit further comprising:

a resilient O-ring seal confined with an annular chamber formed between said journal and said cutter to isolate the lubricant from external pumping fluids, said annular chamber being formed by the cooperation of two substantially radial surfaces and two substantially cylindrical surfaces formed between said journal and said cutter, with at least one of said cylindrical surfaces being substantially in a V with a vertex positioned about centrally on the axial length, and directed so as to enlarge said annular chamber at said vertex, said O-ring being centrally positioned with said annular chamber when the hydraulic pressures from the lubricant and the external pumping fluids acting on said O-ring are equal, said O-ring being axially movable away from said central position upon any differential hydraulic pressure acting on said O-ring thereby increasing the squeeze on said O-ring to enable the O-ring to resist egress of lubricant from the bearing area of ingress of said external pumping fluids or materials into said bearing area.

5. The invention as set forth in claim 4 wherein said vertex is rounded, having a radius no larger than the radius of cross section of said O-ring.

6. The invention as set forth in claim 4 wherein said axial V-shaped surface has an included angle in the range of 110 degrees to 170 degrees.

7. The invention as set forth in claim 4 wherein said axial V-shaped surface has an included angle of about 150 degrees.

8. The invention as set forth in claim 4 wherein said annular chamber has an axial dimension in the range of one and one-half to two and one-half times the cross-sectional diameter of said O-ring.

9. The invention as set forth in claim 4 wherein said resilient O-ring is composed of nitrile.

* * * * *